United States Patent
Cho et al.

(10) Patent No.: US 12,202,408 B2
(45) Date of Patent: Jan. 21, 2025

(54) VEHICLE DOOR ASSEMBLY

(71) Applicant: NISSAN NORTH AMERICA, INC., Franklin, TN (US)

(72) Inventors: Thomas Cho, Novi, MI (US); James Stepke, Brighton, MI (US); Jonathan Zischke, South Lyon, MI (US); David Snyder, Southfield, MI (US); Ronald B. Morrow, Jr., Novi, MI (US); Anders Johnson, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 317 days.

(21) Appl. No.: 17/829,312

(22) Filed: May 31, 2022

(65) Prior Publication Data
US 2023/0382200 A1 Nov. 30, 2023

(51) Int. Cl.
*B60R 1/06* (2006.01)
*B60J 5/04* (2006.01)

(52) U.S. Cl.
CPC .............. *B60R 1/06* (2013.01); *B60J 5/0404* (2013.01)

(58) Field of Classification Search
CPC ................................ B60J 5/0404; B60R 1/06
USPC ....................................................... 296/1.11
See application file for complete search history.

(56) References Cited

U.S. PATENT DOCUMENTS

| | | | | |
|---|---|---|---|---|
| 6,637,900 | B2 * | 10/2003 | Ohashi ..................... | B60R 1/06 359/872 |
| 8,342,702 | B2 * | 1/2013 | Ohe ......................... | B60R 1/06 359/872 |
| 10,589,683 | B2 | 3/2020 | Bortolon et al. | |
| 10,889,172 | B2 * | 1/2021 | Iwai ......................... | B60J 10/86 |
| 11,167,694 | B2 * | 11/2021 | Suto ......................... | B60R 1/06 |
| 11,505,125 | B2 * | 11/2022 | Caraan ..................... | B60R 1/06 |
| 11,872,873 | B2 * | 1/2024 | Snyder .................... | B60J 5/0413 |
| 11,926,195 | B2 * | 3/2024 | Yanoshita ............... | B60J 10/88 |
| 11,975,598 | B2 * | 5/2024 | Snyder .................... | B60J 5/045 |
| 2011/0194201 | A1 * | 8/2011 | Muramatsu ........... | B60J 5/0404 359/871 |
| 2023/0264629 | A1 * | 8/2023 | Matsubara ............. | B60R 13/07 359/871 |

FOREIGN PATENT DOCUMENTS

GB 2438847 A * 12/2007 .............. B60R 1/06

* cited by examiner

*Primary Examiner* — Jason S Morrow
(74) *Attorney, Agent, or Firm* — Global IP Counselors, LLP

(57) ABSTRACT

A vehicle door assembly comprises an inner door panel, an outer door panel and a mirror assembly. The outer panel is fixed to the inner door panel, the outer door panel having an mounting opening. The mirror assembly is supported to an outer perimeter of the mounting opening of the outer door panel. The mirror assembly has a base bracket and a dampener. The dampener is disposed between the base bracket and at least a portion of the outer perimeter mounting opening of the outer door panel such that the base bracket and the outer door panel are spaced with respect to each other by the dampener.

20 Claims, 17 Drawing Sheets

VEHICLE DOOR ASSEMBLY

BACKGROUND

Technical Field

The present disclosure generally relates to a vehicle door assembly. More specifically, the present disclosure relates to a vehicle door assembly equipped with a mirror assembly.

Background Information

Side view mirrors are typically installed to areas of a vehicle door assembly adjacent to a window at or at least partially above the bottom end of a window opening of the door assembly. Side view mirror are also sometimes installed to the door assembly at a location below the bottom end of the window opening.

SUMMARY

In view of the state of the known technology, one aspect of the present disclosure is to provide a vehicle door assembly comprises an inner door panel, an outer door panel and a mirror assembly. The outer panel is fixed to the inner door panel, the outer door panel having an mounting opening. The mirror assembly is supported to an outer perimeter of the mounting opening of the outer door panel. The mirror assembly has a base bracket and a dampener. The dampener is disposed between the base bracket and at least a portion of the outer perimeter mounting opening of the outer door panel such that the base bracket and the outer door panel are spaced with respect to each other by the dampener.

In view of the state of the known technology, another aspect of the present disclosure is to provide a mirror assembly for a vehicle door. The mirror assembly comprises a base bracket and a dampener. The dampener is disposed between the base bracket and at least a portion and the vehicle door. the base bracket and the vehicle door are spaced with respect to each other by the dampener when the base bracket is supported to the vehicle door.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
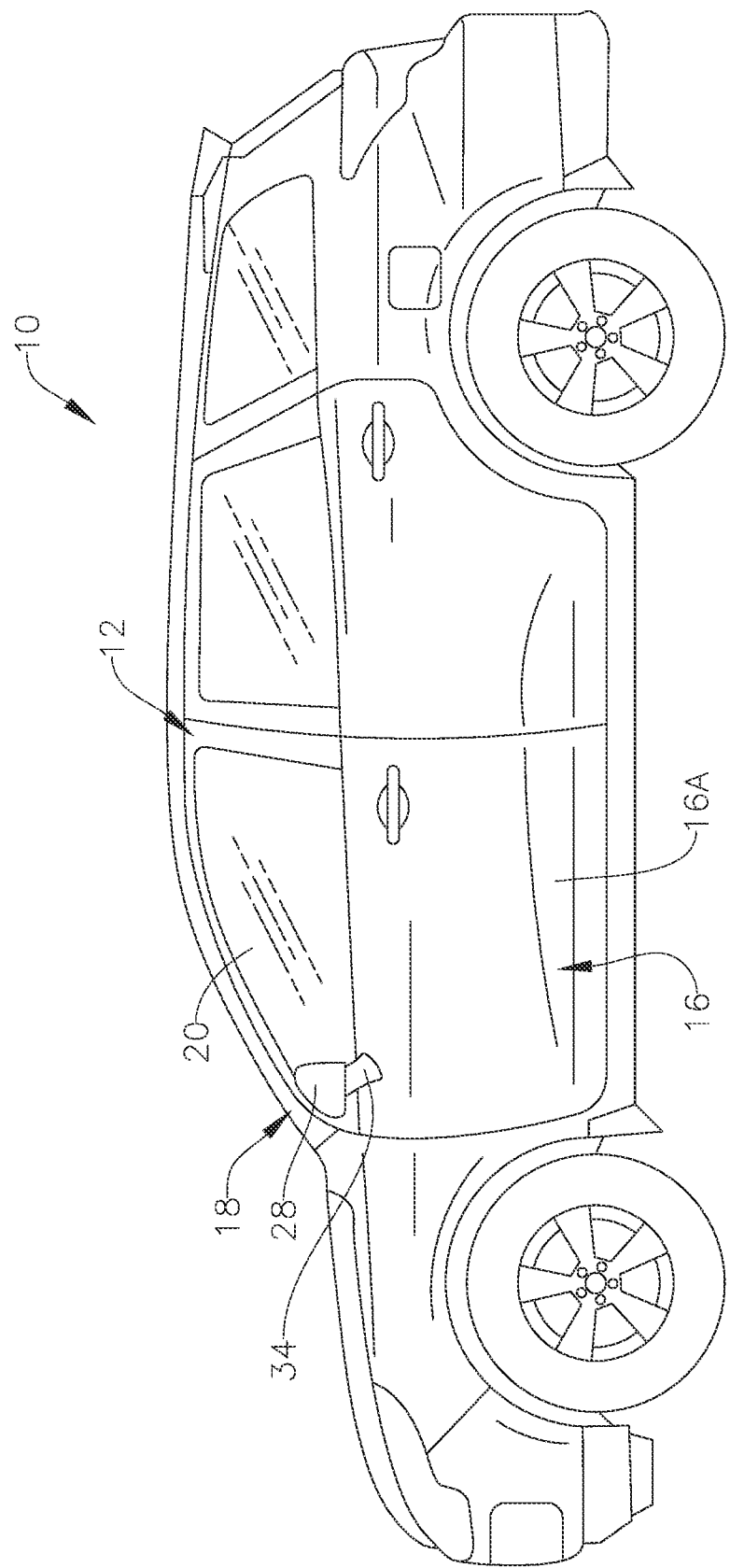
FIG. 1 is a side elevational view of a vehicle equipped with a vehicle door assembly and a mirror assembly.
Figure 2:
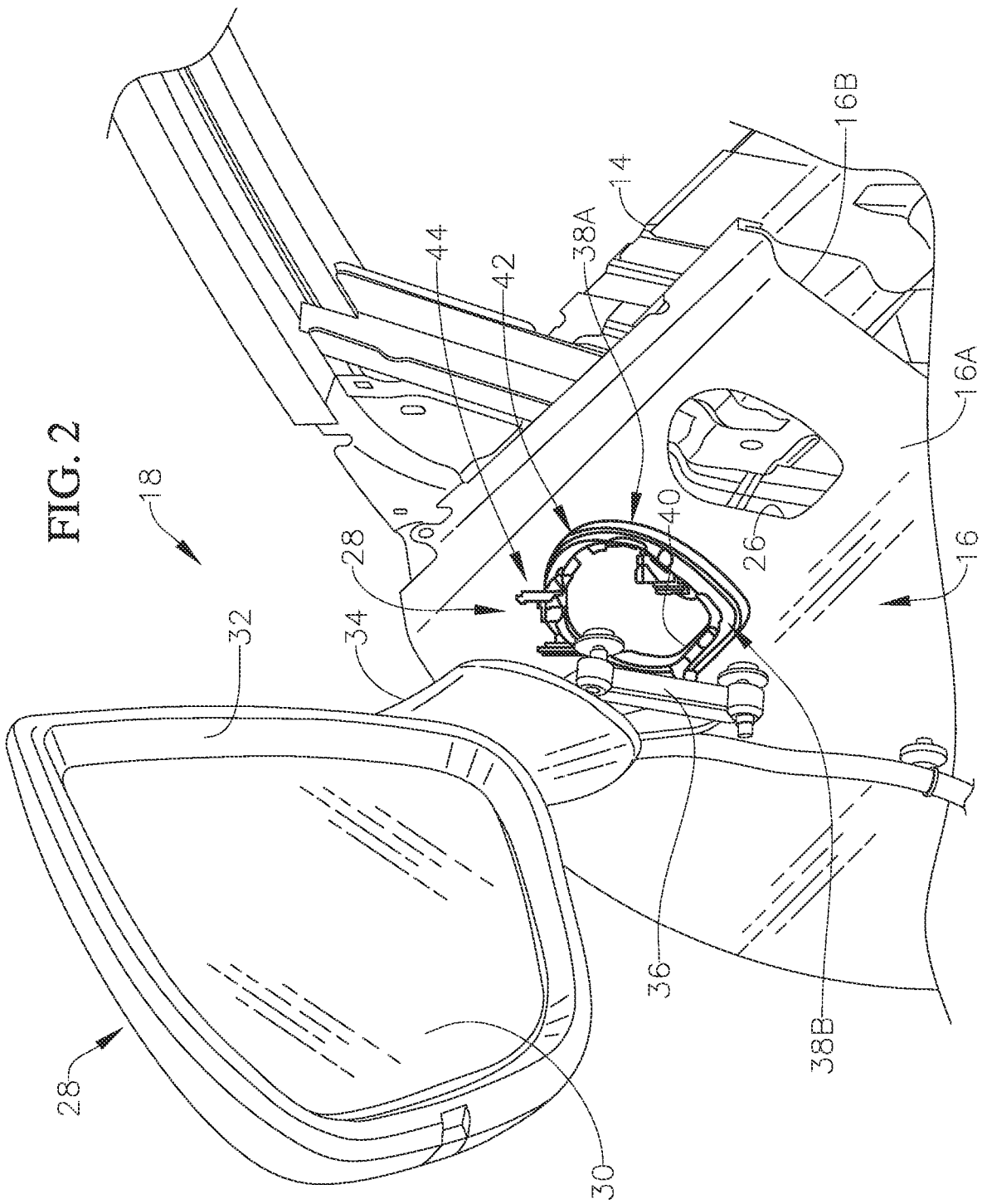
FIG. 2 is an exploded perspective view of the vehicle door assembly and the mirror assembly.
Figure 3:
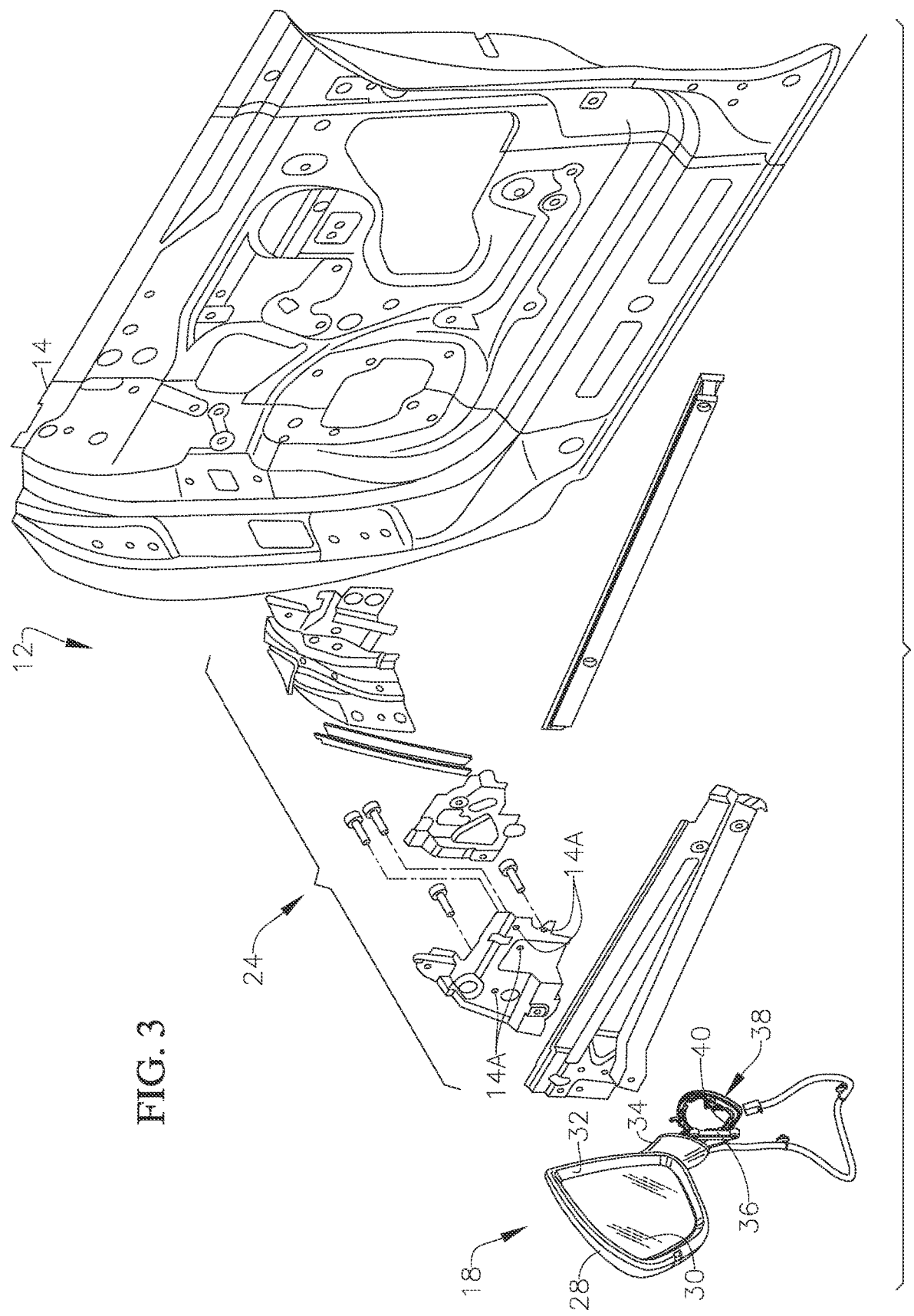
FIG. 3 is a exploded perspective view of the door assembly with the outer door panel removed.
Figure 4:
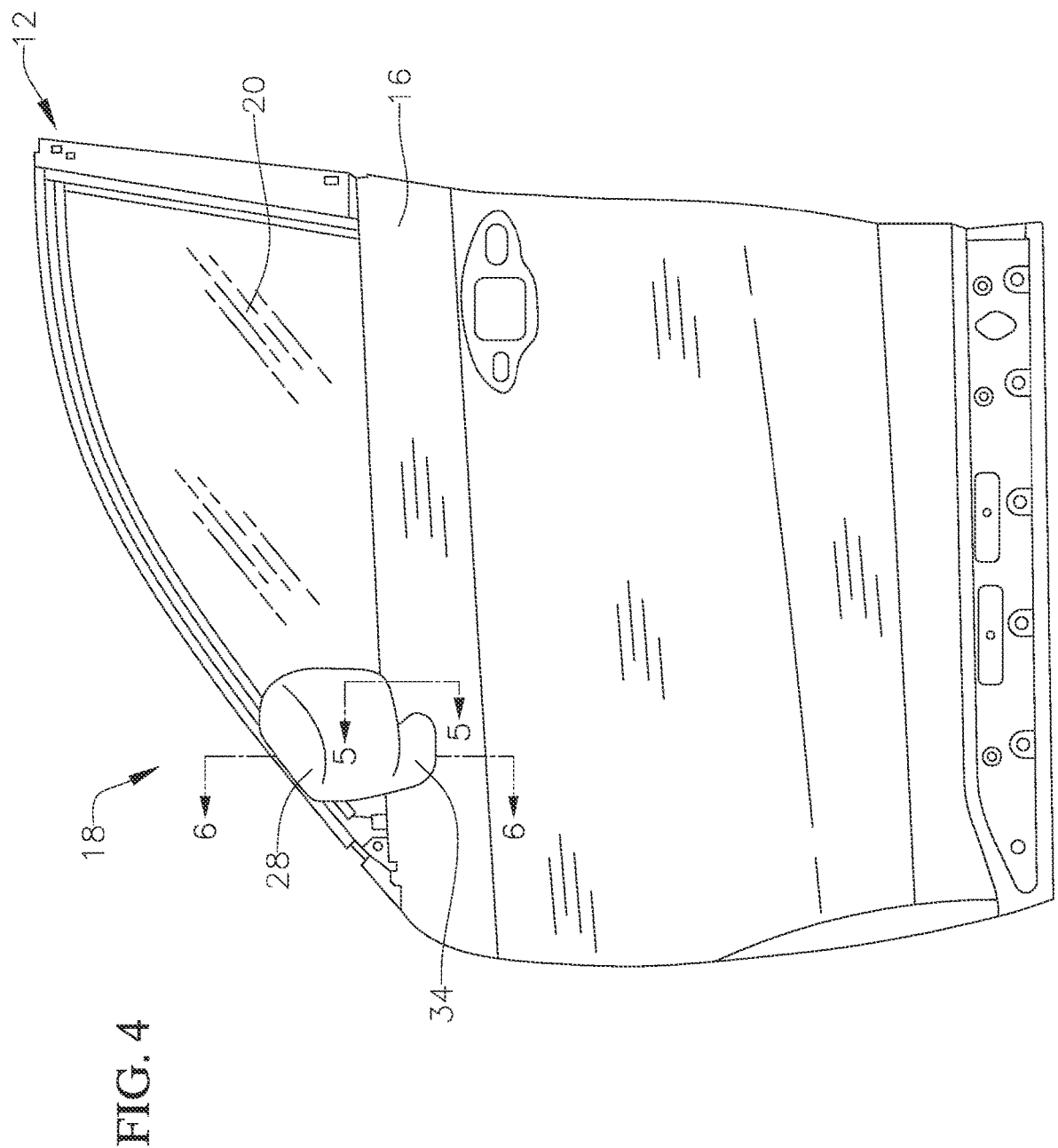
FIG. 4 is a side elevational view of the vehicle door assembly equipped with the mirror assembly.

Referring initially to FIG. 1, a vehicle 10 equipped with a vehicle door assembly 12 in accordance with an illustrated embodiment. The vehicle door assembly 12 comprises an inner door panel 14 and an outer door panel 16. The vehicle door assembly 12 of the illustrated embodiment further comprises a mirror assembly 18 as will be further discussed below. That is, the vehicle 10 includes the mirror assembly 18 that is configured to be mounted to the vehicle door assembly 12. The mirror assembly 18 is considered a side mirror assembly used for detecting traffic behind the vehicle 10. As shown in FIGS. 1 to 3, the mirror assembly 18 is attached to the door assembly 14 at a location below a window pane 20. The mirror assembly 18 is supported to the door assembly, as is described in greater detail below. While the mirror assembly 18 is illustrated as being mounted to a driver's side vehicle door, it will be apparent to those skilled in the vehicle field from this disclosure that the mirror assembly 18 described herein can be mounted to a passenger's side vehicle door.

As best seen in FIGS. 2 and 3, the inner door panel 14 and the outer door panel 16 are assembled to each other. Preferably, the inner door panel 14 and the outer door panel 16 can be welded to each other at one or more seams. The inner door panel 14 and the outer door panel 16 are separated from a cavity 22 when assembled to each other. As best seen in FIG. 3, the door assembly further includes a reinforcement assembly 24 that is positioned in the cavity 22 between the inner door panel 14 and the outer door panel 16. The reinforcement assembly 24 can optionally include one or more reinforcement beams to reinforce the structure of the inner and outer door panels 14 and 16 when assembled to each other. The reinforcement assembly 24 can comprise of a mixture of brackets, panels and beams and other rigid structures that help provide structural support to the vehicle door assembly 12. The reinforcement assembly 24 also help rigidly support the mirror assembly 18 to the vehicle door assembly 12. Most, if not all, of the elements that make up the door assembly can be made of aluminum, aluminum alloy or other metallic materials.

As best seen in FIG. 3, the reinforcement assembly 24 includes one or more fastening openings 14A. As shown, the reinforcement assembly includes a plurality of fastening openings 14A and slots that receive fasteners F for attaching the mirror assembly 18 to the door assembly 12. The mirror assembly 18 further comprises a plurality of fasteners F that are configured to attach the base bracket 34 to the vehicle door assembly 12, as will be described below. The fastening openings 14A are illustrated as an example only to correspond to the shape and design of the mirror assembly 18. It will be apparent to those skilled in the vehicle field from this disclosure that the fastening openings 14A can be arranged, sized and dimensioned in alternative ways in order to secure the mirror assembly 18 other mirror assemblies of different sizes, shapes and dimensions.

Preferably, the mirror assembly 18 aligns with one or more structures of the reinforcement assembly 24 when the mirror assembly 18 is assembled to the vehicle door assembly 12. The reinforcement assembly 24 can be fixed to either the mirror assembly 18 and/or the inner door panel 14 by fasteners F and/or rivets, as needed and/or desired. The reinforcement assembly 24 is also illustrated herein as an example. It will be apparent to those skilled in the vehicle field from this disclosure that the vehicle door assembly 12 can include alternate or modified structures of the reinforcement assembly 24 to support the mirror assembly 18 to the vehicle door assembly 12 as needed and/or desired.

As stated, the outer door panel 16 is fixed to the inner door panel 14. The outer door panel 16 includes an inboard side 16A facing a vehicle inboard direction and an outboard side 16B facing the vehicle exterior direction. As best seen in FIG. 2, the outer door panel 16 has a mounting opening 26. The mirror assembly 18 is supported to the mounting opening 26 of the outer door panel 16 and is partially received by the mounting opening 26, as will be further described below. As shown, the mounting opening 26 is defined by an outer perimeter that leads to the cavity 22 of the vehicle door assembly 12. The mirror assembly 18 is supported to the outer perimeter, as will be further described below.

As best seen in FIGS. 2 to 7, the mirror assembly 18 includes a mirror cover 28, a mirror pane 30 and a frame 32 that are assembled to a base bracket 34. The bracket forms a bottom shell of the mirror assembly 18. Preferably, the mirror cover 28, the mirror pane 30 and the frame 32 are together pivotable with respect to the base bracket 34 so that the user can adjust the rear view projected from the mirror assembly 18. The mirror assembly 18 further includes an attachment flange 36 protruding from the base bracket 34. The attachment flange 36 is a rigid member preferably made of plastic. As best seen in FIGS. 2 and 3, the attachment flange 36 extends towards in a vehicle inboard direction when the mirror assembly 18 is installed to the door assembly. In the illustrated embodiment, the term "inboard direction" refers to a direction towards a passenger compartment or interior of the vehicle 10. The term "outboard direction" refers to a direction away from the inboard direction and towards the vehicle exterior.

Figure 5:
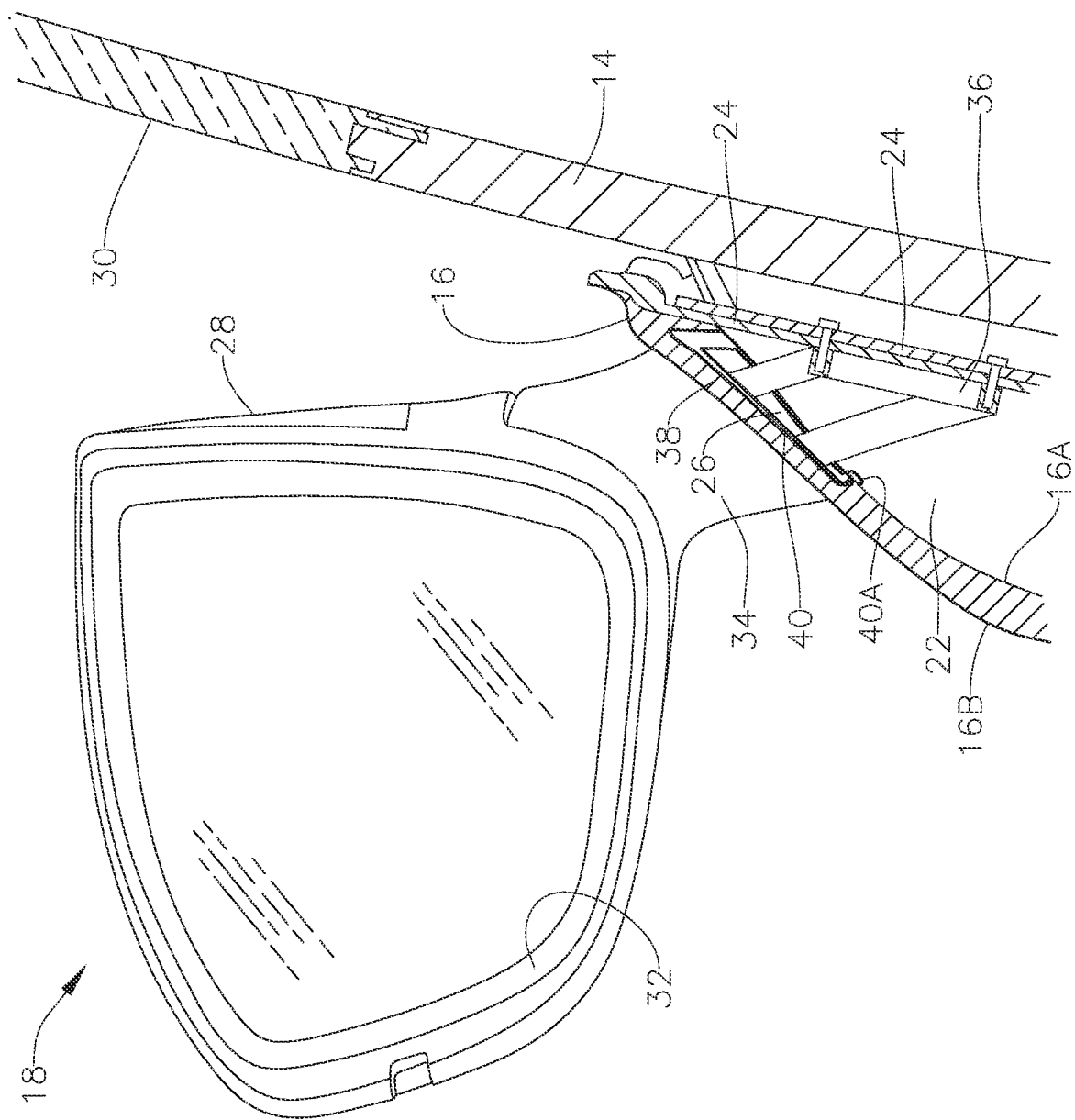
FIG. 5 is a cross-sectional view of the mirror assembly taken along lines 5-5 of FIG. 4.
Figure 6:
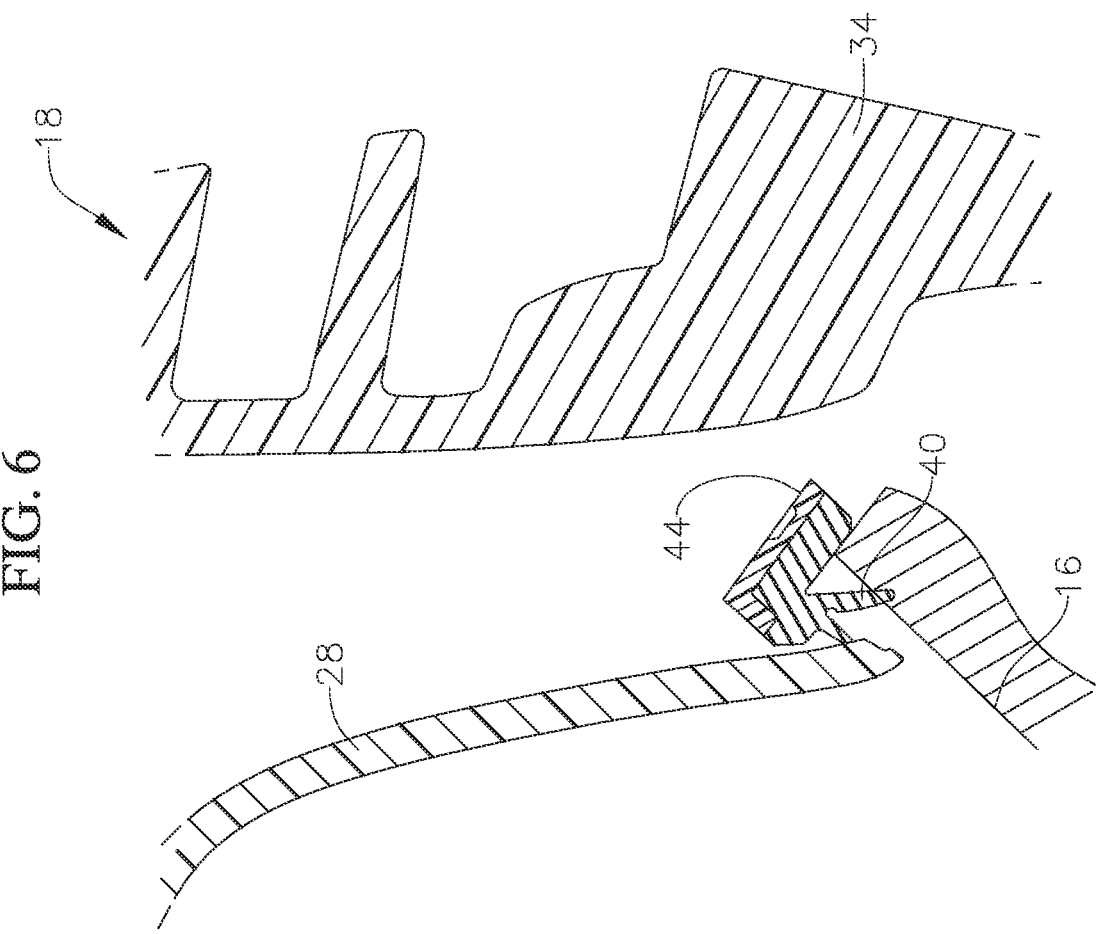
FIG. 6 is a cross-sectional view of the mirror assembly taken along lines 6-6 of FIG. 4.

As best seen FIG. 5, the attachment flange 36 is received by the mounting opening 26 of the outer door panel 16 and is secured to the inner door panel 14 via one or more structures of the reinforcement assembly 24. Alternatively, the attachment flange 36 can be secured directly to the inner door panel 14 as needed and/or desired. The attachment flange 36 includes a plurality of fastener openings 36A. The fastener openings 36A of the attachment flange 36 align with the fastening openings 14A of the inner door panel 14. In the illustrated embodiment, the fastening openings 14A of the attachment flange 36 and the inner door panel 14 also align with corresponding openings in the reinforcement assembly 24.

The fasteners F extend through the fastening openings 14A to secure the mirror assembly 18 to the vehicle door assembly 12. In this way, the fasteners F extend through the cavity 22 between the inner and outer door panels 14 and 16. It will be apparent to those skilled in the vehicle field from this disclosure that the door assembly 12 can include additional intermediate fasteners F that fasten parts of the reinforcement assembly 24 to the mirror assembly 18 that are then subsequently assembled to the inner door panel 14.

Figure 7:
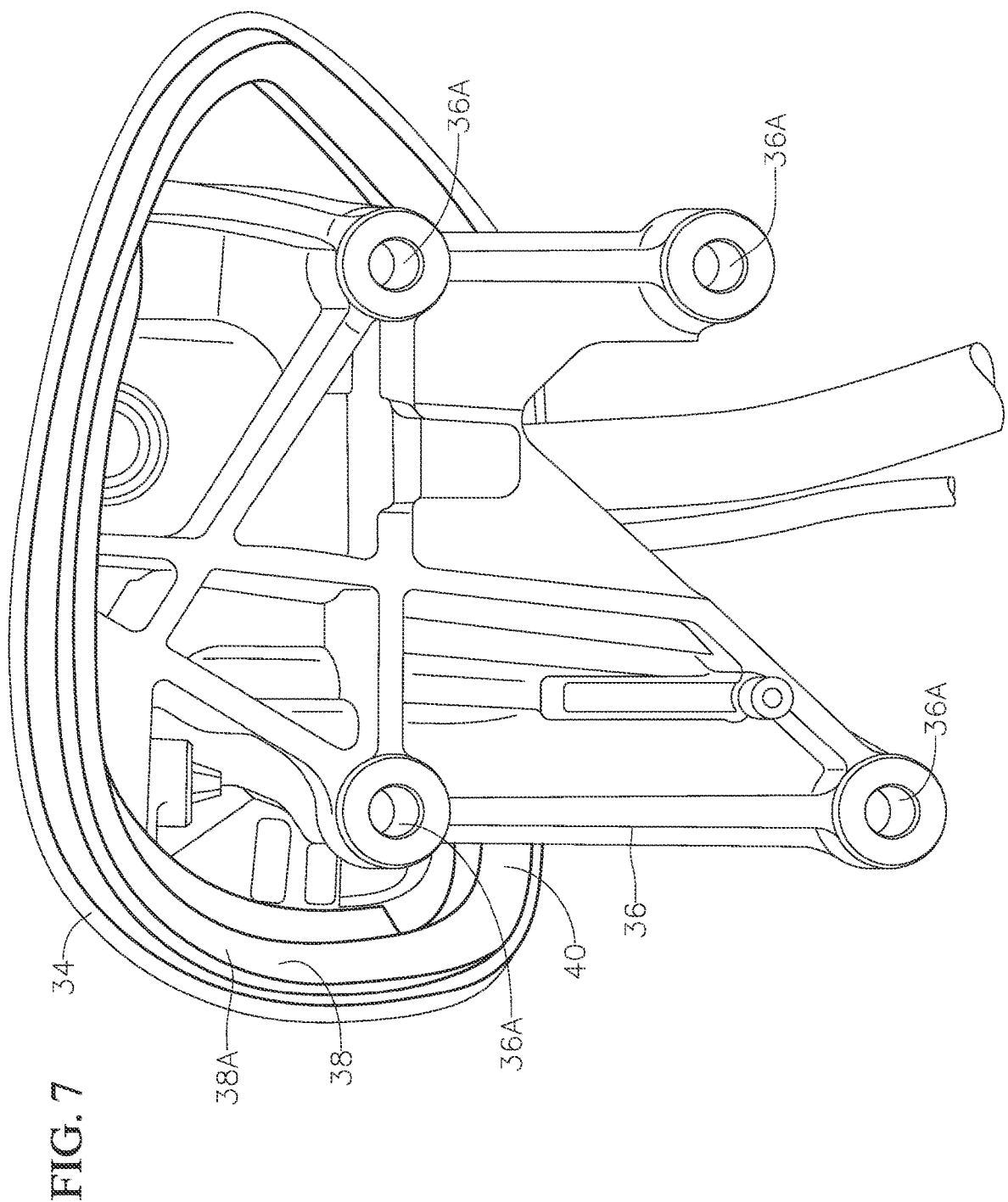
FIG. 7 is an elevational view of an end of a base bracket of the mirror assembly having a dampener provided thereon.

The mirror assembly 18 of the illustrated embodiment further includes a gasket 38. The mirror assembly 18 of the illustrated embodiment further includes a dampener 40. As best seen in FIG. 7, the base bracket 34 supports the attachment flange 36 and the dampener 40. As best seen in FIGS. 7 to 10, the gasket 38 is a ring defining an open center. The gasket 38 includes an inboard side 38A that faces the vehicle door assembly 12 and an outboard side 38B that faces the base bracket 34. The gasket 38 preferably has a main body 42 that defines the ring and a plurality of attachment mechanisms 44 or fasteners F that are integrally formed with the main body 42. The attachment mechanisms 44 are positioned on the outboard side of the gasket 38 to fix the gasket 38 to the base bracket 34. As shown in FIGS. 9 and 10, the attachment mechanisms 44 include mounting protrusions and mounting opening 26s for attaching the gasket 38 to the base bracket 34.

The gasket 38 contacts the outer perimeter of the mounting opening 26 when the mirror assembly 18 is installed to the door assembly. The fasteners F extend through the center opening of the gasket 38 to support the mirror assembly 18 to the door when the mirror assembly 18 is supported to the door. That is, the fasteners F preferably attach the attachment bracket to the door assembly. In this way, the fasteners F extend adjacent to the gasket 38 to be received by the fastener openings 36A of the attachment flange 36.

The dampener 40 is provided with the mirror assembly 18 to dampen the vibration of the rigid components of the mirror assembly 18 during vehicle 10 use. The dampener 40 forms a direct contact with both the base bracket 34 and the outer door panel 16. The dampener 40 prevents the base bracket 34 from directly contacting the outer door panel 16. As stated, the dampener 40 is assembled to the base bracket 34 of the mirror. That is, the dampener 40 is fitted to the bottom shell of the mirror assembly 18 to form a direct contact between the mirror assembly 18 and the vehicle door assembly 12. That is, the rigid components at the base bracket 34 and also the attachment flange 36 of the mirror are spaced from the vehicle door assembly 12 via the dampener 40.

Figure 12:
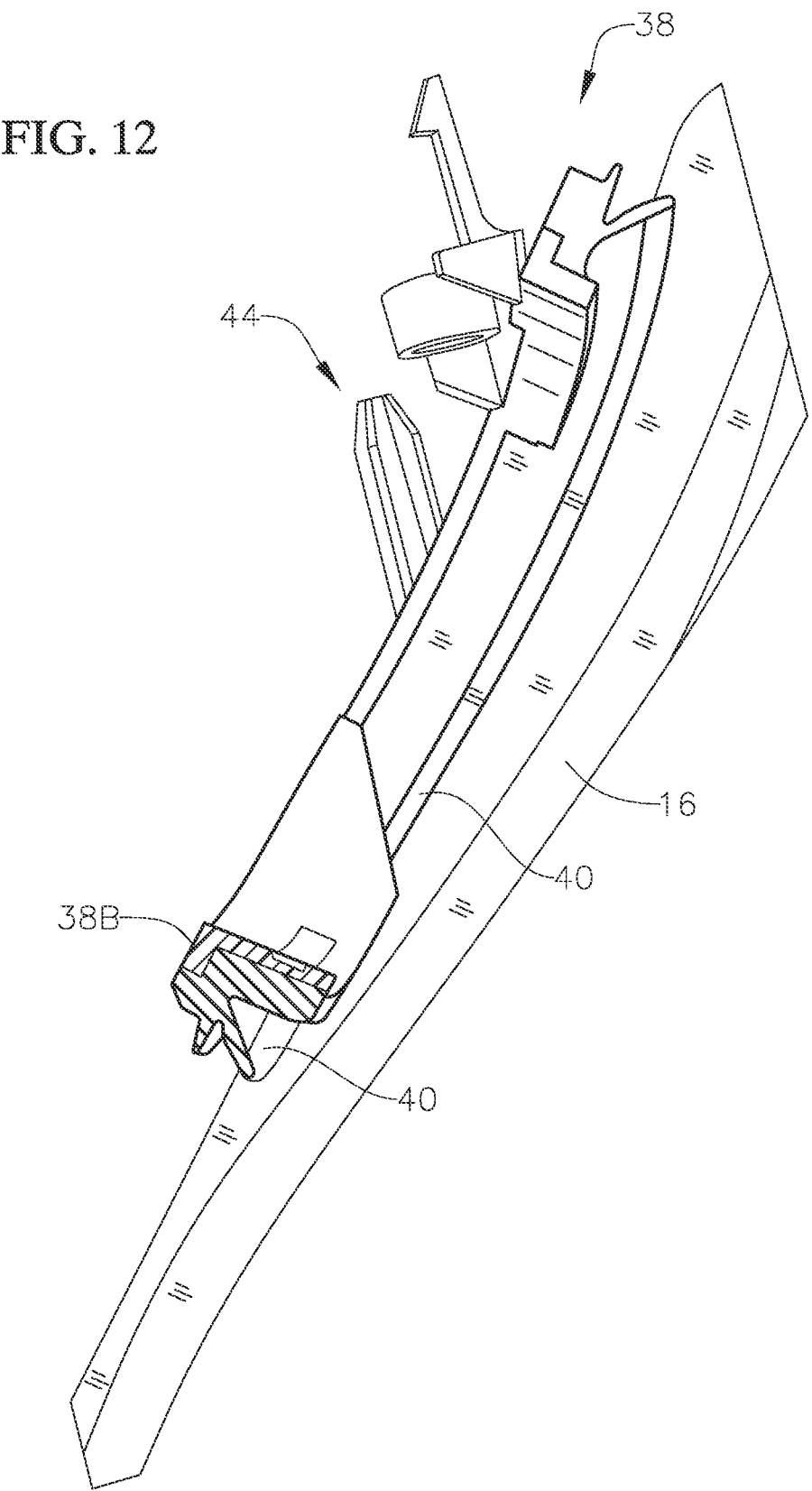
FIG. 12 is a cross-sectional view taken along lines 12-12 of FIG. 8.
Figure 13:
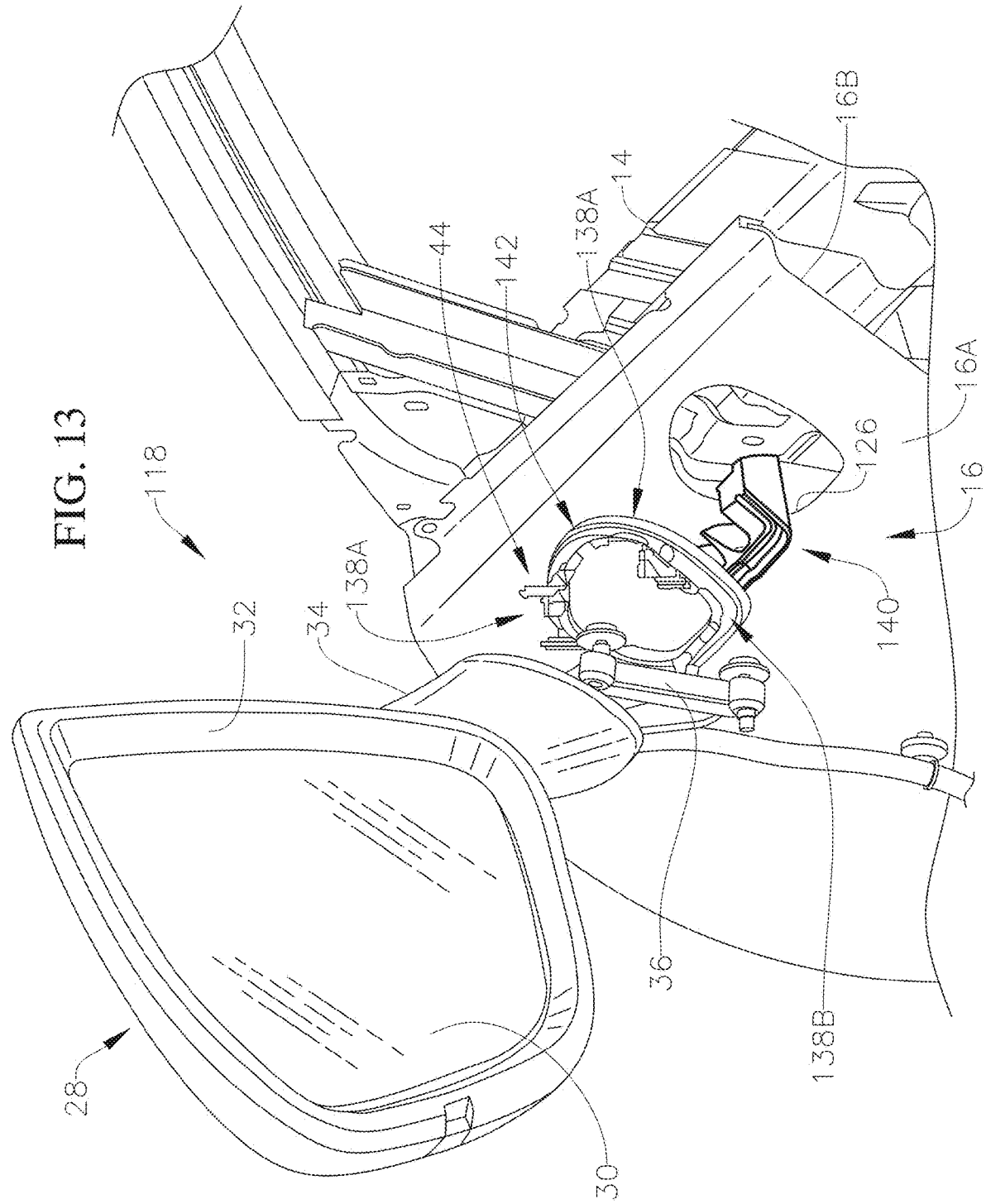
FIG. 13 is an exploded perspective view of the vehicle door assembly and equipped with a modified mirror assembly.

Therefore, the dampener 40 is provided to dampen any rattling between the base bracket 34 and the outer door panel 16, or any rattling between the attachment flange 36 and the outer door panel 16. As best seen in FIGS. 5 and 12, the dampener 40 directly contacts the outer perimeter of the mounting opening 26 of the outer door panel 16. As best seen in FIG. 7, the dampener 40 is preferably fitted to the base bracket 34 by interference fit. In the illustrated embodiment, the dampener 40 is disposed between the base bracket 34 and at least a portion of the outer perimeter of the mounting opening 26 of the outer door panel 16. In this way, the base bracket 34 and the outer door panel 16 are spaced with respect to each other by the dampener 40 when the base bracket 34 is supported to the vehicle 10 door.

The dampener 40 is at least partially made from a deformable material. In the illustrated embodiment, the terms "deformable" and "elastic" refer to properties in which a material can alter its shape under pressure while still retaining its original shape when that pressure is removed. Preferably, the dampener 40 is at least partially made of a durable rubber such as vulcanized rubber material. As best seen in FIGS. 8 to 12, the inboard side 38A of the gasket 38 is made from an elastic or deformable material such as rubber. The inboard side 38A of the gasket 38 contacts the vehicle door assembly 12. In particular, the inboard side 38A of the gasket 38 contacts the outer door panel 16. The outboard side of the gasket 38 is preferably made of a hard plastic that form the attachment mechanisms 44 that are fixed to the bracket assembly.

Figure 8:
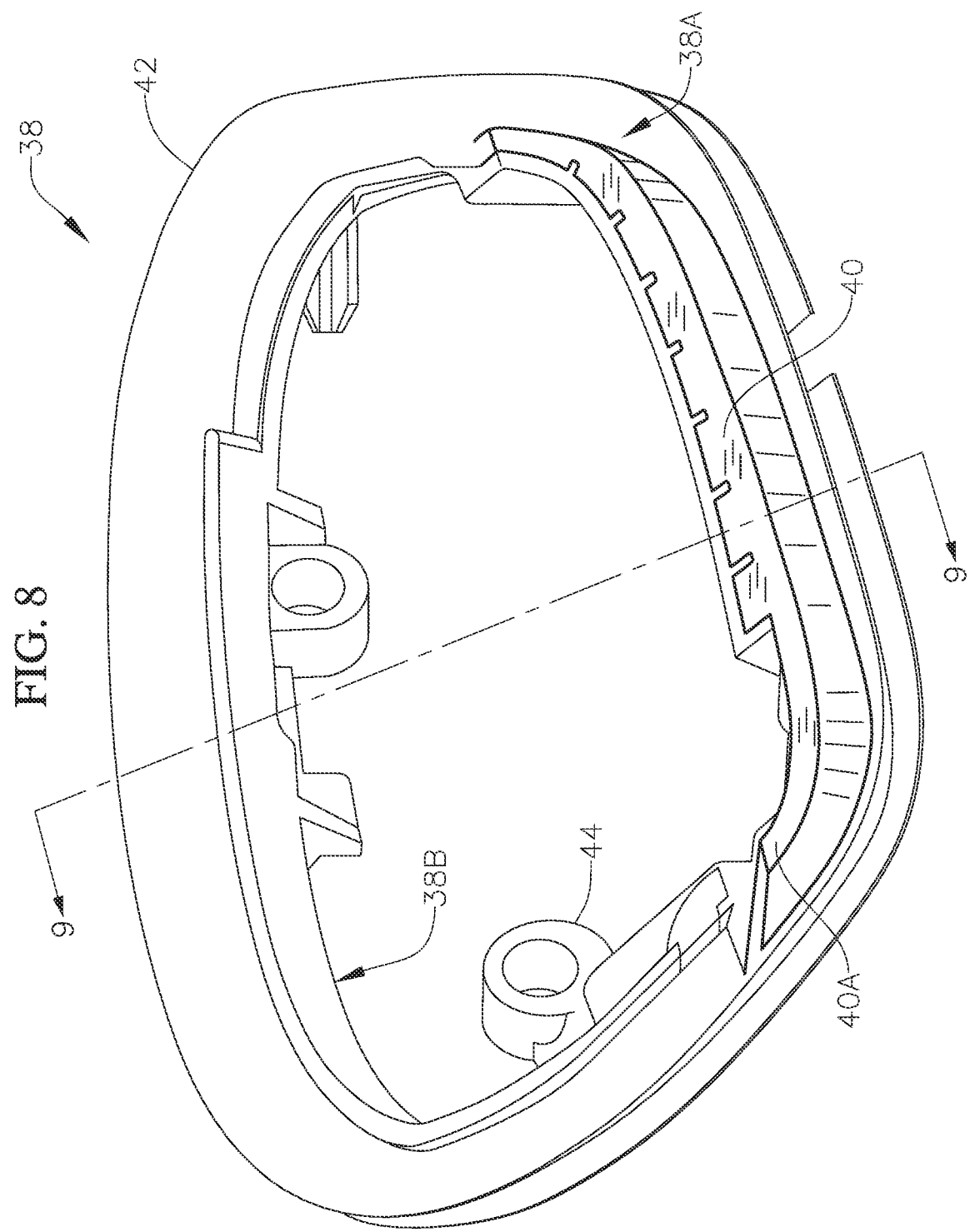
FIG. 8 is an elevational view of an inboard side of the dampener.
Figure 9:
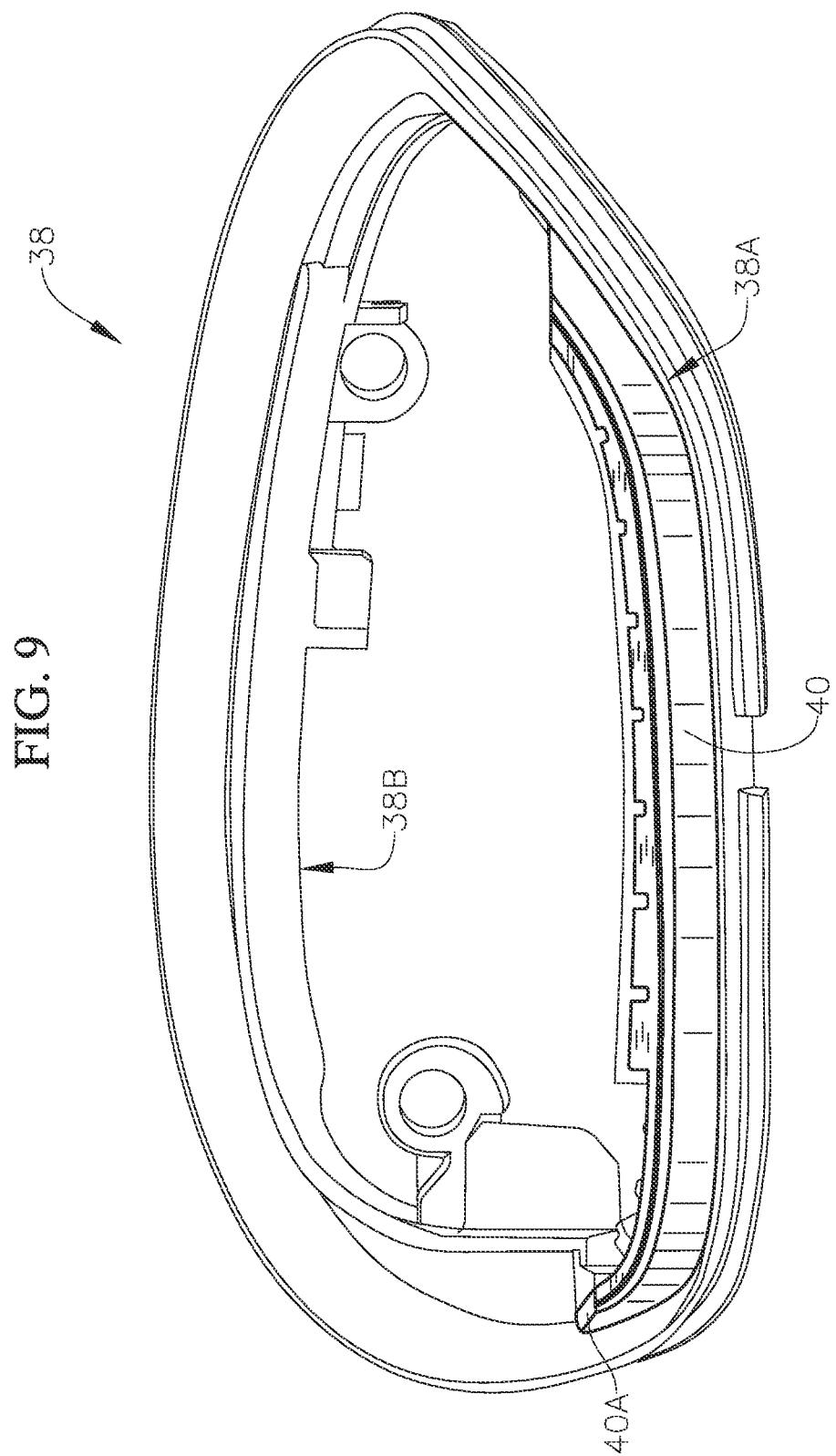
FIG. 9 is a bottom perspective view of an inboard side of the dampener.
Figure 10:
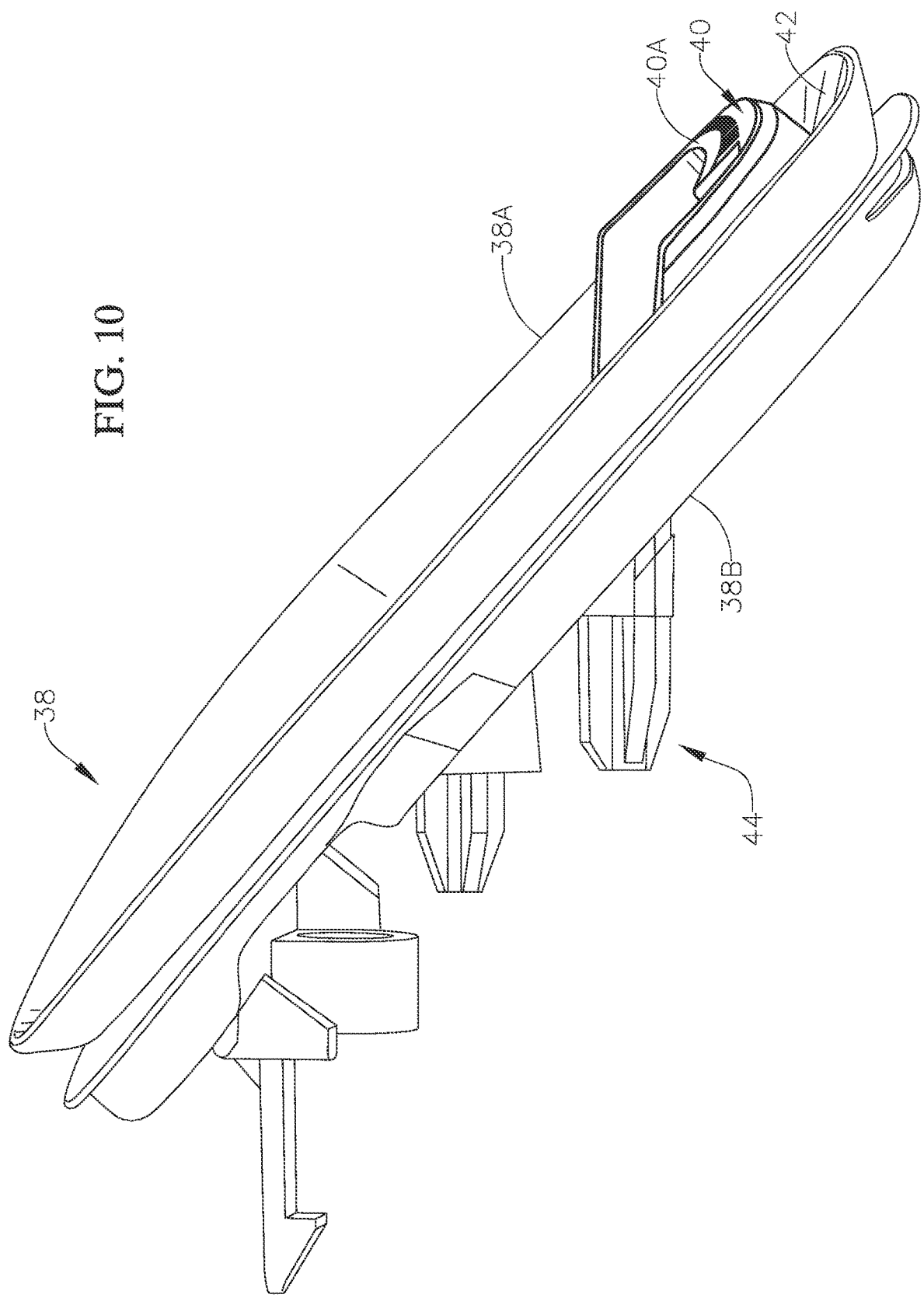
FIG. 10 is a side elevational view of the dampener.
Figure 11:
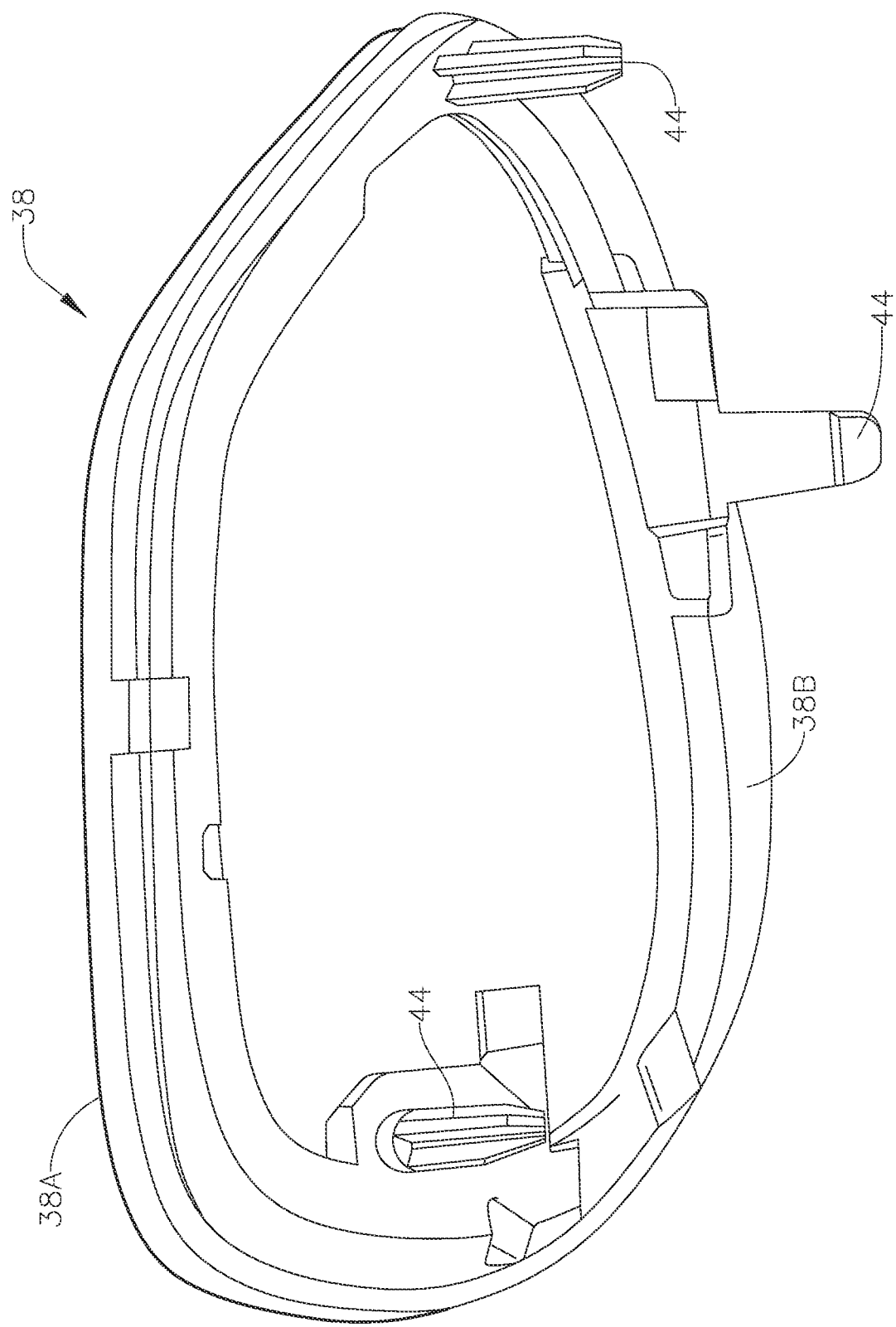
FIG. 11 is an elevational view of an outboard side of the dampener.

As best seen in FIGS. 8 to 10, the inboard side 38A of the gasket 38 includes a semi-circular or arc-shaped protrusion protruding from the main body 42 of the gasket 38. The protrusion protrudes from a bottom region of the gasket 38. As seen in FIG. 5, the gasket 38 partially extends through the mounting opening 26 of the outer door panel 16 when the mirror assembly 18 is installed to the outer door panel 16. Therefore, the dampener 40 extends towards the mounting opening 26 of the vehicle 10 door when the mirror assembly 18 is supported to the door. In particular, the protrusion 40 is positioned between the base bracket 34 and a bottom edge of the outer perimeter of the mounting opening 26. The protrusion 40 extends through the mounting opening 26 from the outboard side of the door panel to the inboard side 16A of the outer door panel 16. In this way, the dampener 40 dampens rattling from the weight of the mirror assembly 18 against the outer door panel 16.

In the illustrated embodiment, the dampener 40 is integrally formed with the gasket 38. That is, the protrusion 40 is integrally formed with the deformable material of the gasket 38. The gasket 38 can be made by 3D printing. Alternatively, the gasket 38 can alternatively be made by injection mold.

Referring now to FIGS. 13 to 17, a modified mirror assembly 118 to be implemented with the vehicle 10 and the door assembly of FIGS. 1 to 12 is illustrated. The modified mirror assembly 118 is identical to the mirror assembly 18 of FIGS. 1 to 12. For simplicity, all identical components of the modified mirror assembly 118 and the mirror assembly 18 will receive the same numbers. All modified components of the modified mirror assembly 118 and the mirror assembly 18 will receive the same numbers increased by 100.

The modified mirror assembly 118 includes a mirror cover 28, a mirror pane 30 and a frame 32 that are assembled to a base bracket 34 that are identical to the mirror assembly 18. The modified mirror assembly 118 further includes an attachment flange 36 protruding from the base bracket 34. The attachment flange 36 is also identical to the attachment flange 36. The modified mirror assembly 118 includes a modified gasket 138 and a modified dampener 140. In the modified mirror assembly 118, the modified gasket 138 and the modified dampener 140 are not integrally formed by are provided separate with respect to each other. The modified gasket 138 includes an outboard side having attachment mechanisms 44 to fix the modified gasket 138 to the base bracket 34. The modified gasket 138 does not have a protrusion 140A that contacts the mounting opening 26 of the outer panel on the inboard side 38A as did with the gasket 38. Rather, the modified dampener 140 is provided as a wedge fitted to the bottom edge of the mounting opening 26.

Figure 15:
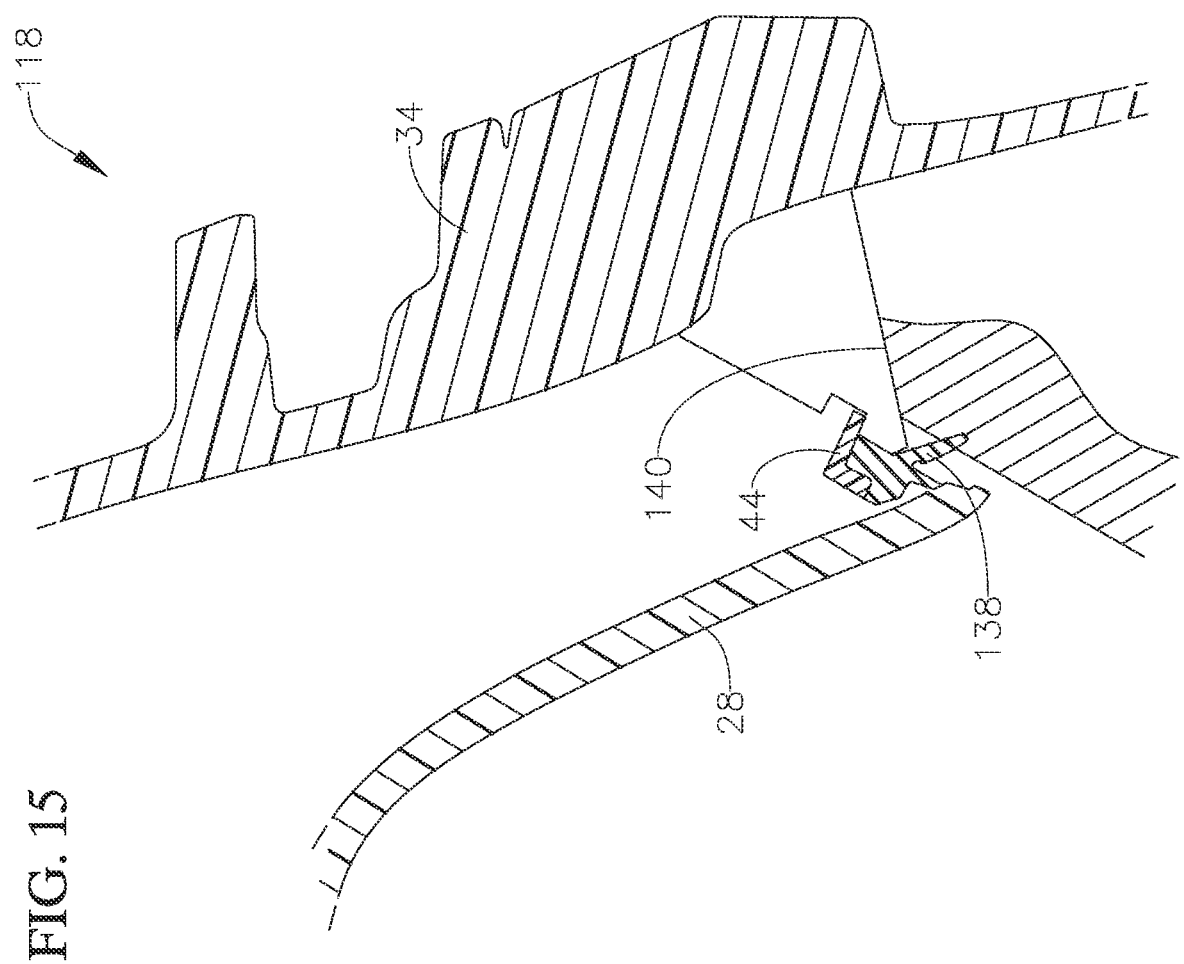
FIG. 15 is another cross-sectional view of the modified mirror assembly.
Figure 16:
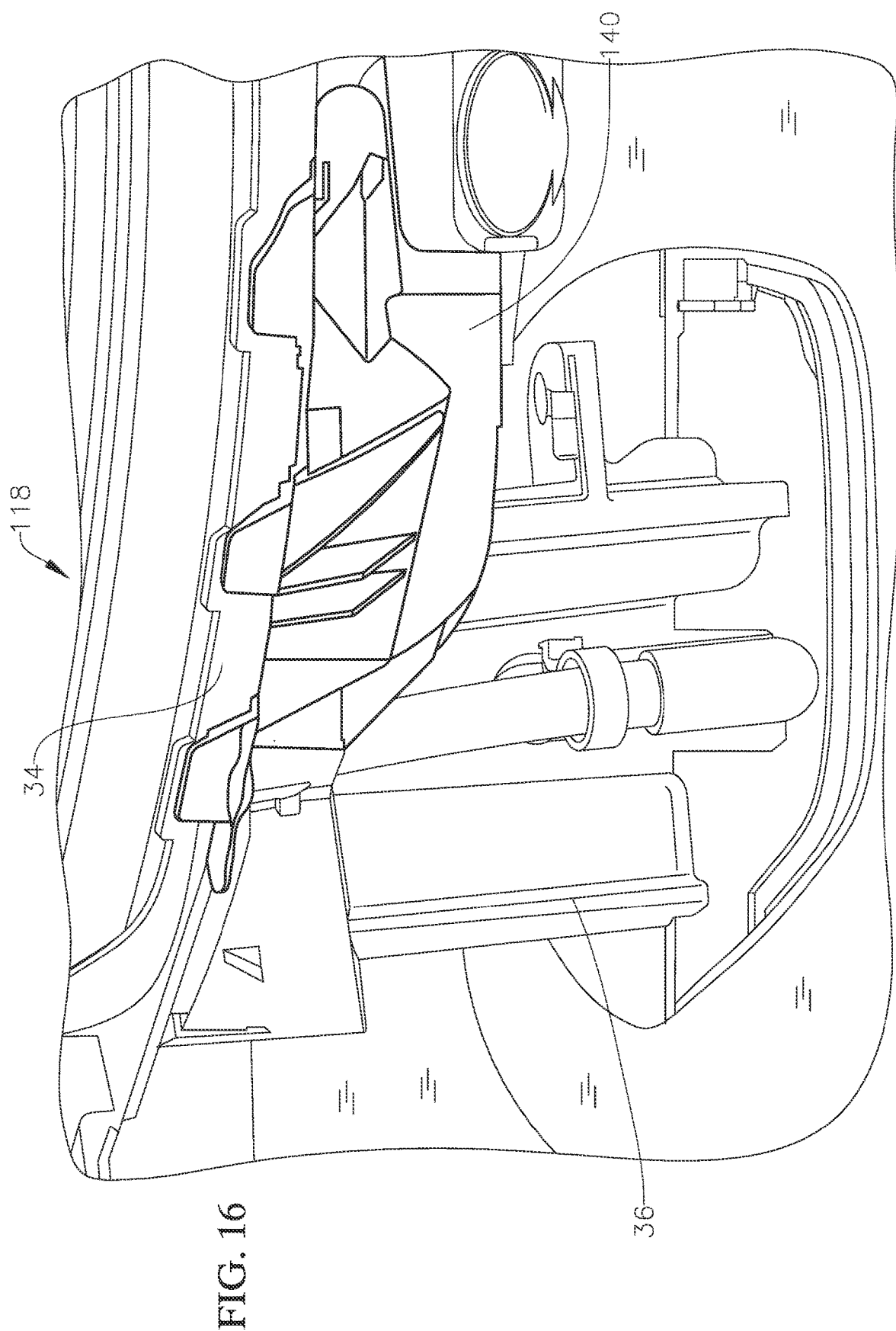
FIG. 16 is a view of a portion of the modified mirror assembly with a modified dampener.
Figure 17:
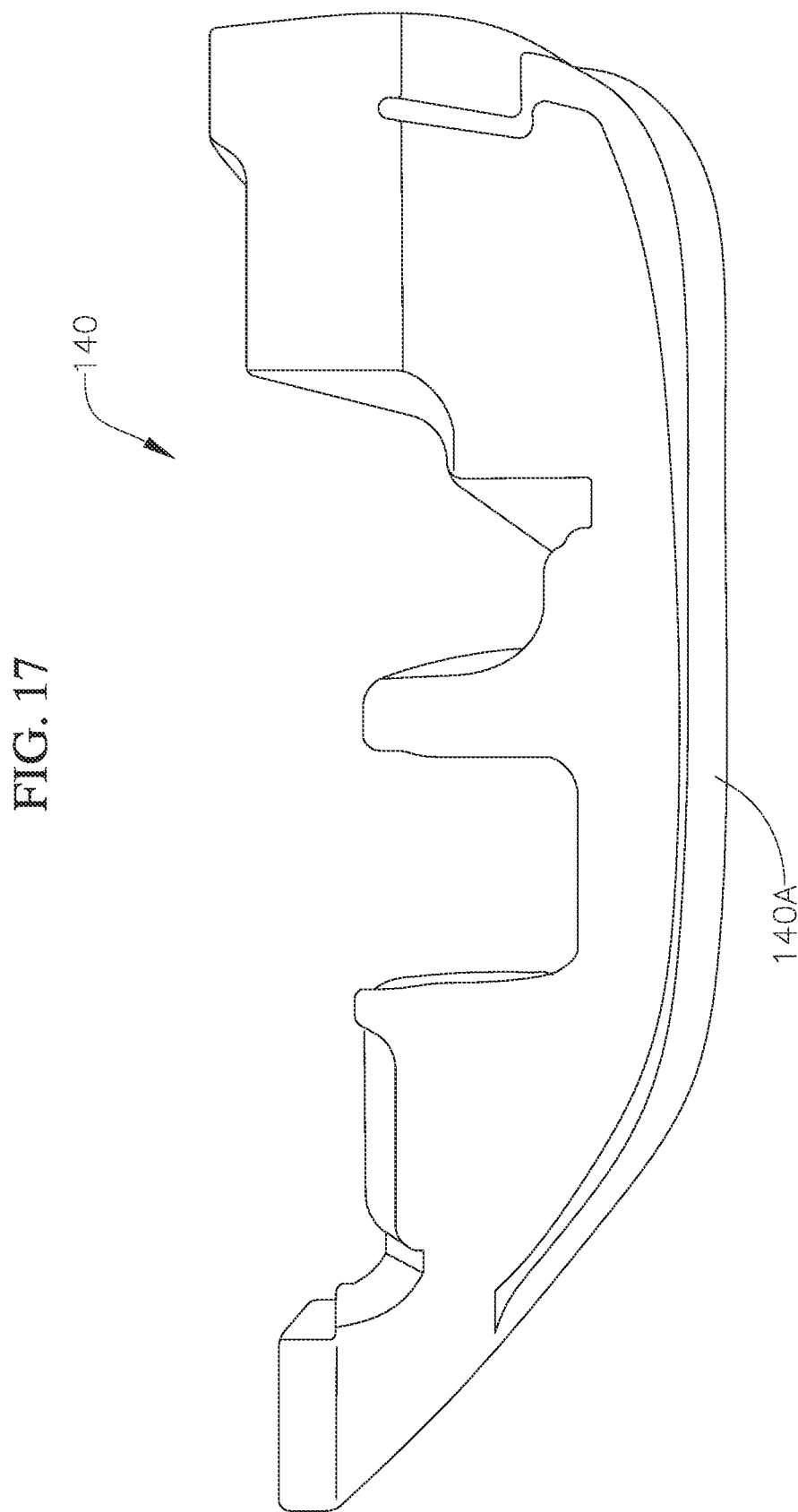
FIG. 17 is an elevational view of the modified dampener.

As best seen in FIG. 16, preferably, the modified dampener 140 is fitted to the bottom of the base bracket 34 by interference fit. Therefore, as seen in FIG. 15, the dampener 40 is preferably shaped and dimensioned to correspond to the shape and dimension of the bottom of the base bracket 34. Therefore, the modified dampener 140 includes contours and protrusions for attaching the dampener 40 to the base bracket 34. The modified dampener 140 includes a contact surface that is arc-shaped and semi-circular to contact the bottom edge of the mounting opening 26. Therefore, the modified dampener 140 abuts the bottom edge of the outer perimeter of the mounting opening 26.

Figure 14:
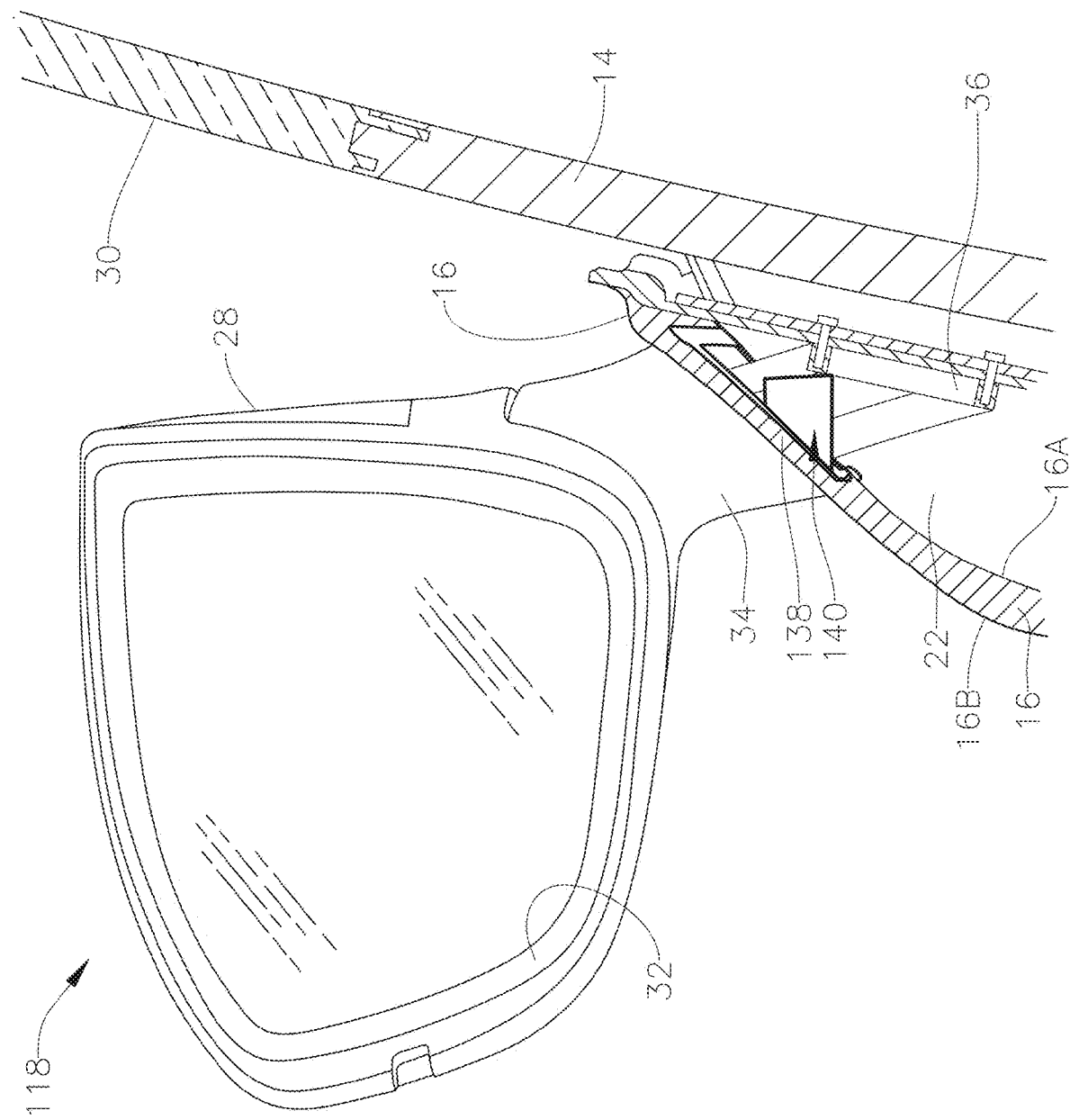
FIG. 14 is a cross-sectional view of a portion of the vehicle door assembly with the modified mirror assembly mounted thereon.

As seen in FIG. 14, the modified dampener 140 is primarily disposed on the inboard surface of the outer door panel 16 while the base bracket 34 sits on the outboard surface of the outer door panel 16. The modified dampener 140 extends between the gasket 38 and the vehicle door when the mirror assembly 18 is supported to the door. Here, the modified dampener 140 is provided between the modified gasket 138 and the opening of the outer door panel 16. The modified dampener 140 is preferably made from a deformable material such as vulcanized rubber. The modified dampener 140 can be made from 3D printing or be injection molded.

In understanding the scope of the present invention, the term "comprising" and its derivatives, as used herein, are intended to be open ended terms that specify the presence of the stated features, elements, components, groups and/or steps, but do not exclude the presence of other unstated features, elements, components, groups and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle door assembly. Accordingly, these terms, as utilized to describe the present invention should be interpreted relative to a vehicle equipped with the vehicle door assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A vehicle door assembly, comprising:
an inner door panel;

an outer door panel fixed to the inner door panel, the outer door panel having a mounting opening;

an attachment flange extending through the mounting opening; and a mirror assembly supported to an outer perimeter of the mounting opening of the outer door panel, the mirror assembly having a base bracket and a dampener, the dampener being disposed between the base bracket and at least a portion of the outer perimeter mounting opening of the outer door panel such that the base bracket and the outer door panel are spaced with respect to each other by the dampener and the attachment flange and the outer door panel are also spaced with respect to each other by the dampener.

2. The vehicle door assembly according to claim 1, wherein the dampener is made from a deformable material.

3. The vehicle door assembly according to claim 2, wherein the dampener is assembled to the base bracket of the mirror.

4. The mirror assembly according to claim 3, further comprising a plurality of fasteners configured to attach the base bracket to the vehicle door, the fasteners extending through a cavity between the inner and outer panels.

5. The vehicle door assembly according to claim 4, wherein the dampener is fitted to the base bracket of the mirror by interference fit.

6. The vehicle door assembly according to claim 5, wherein the dampener is positioned between the base bracket and a bottom edge of the outer perimeter of the mounting opening.

7. The vehicle door assembly according to claim 4, wherein the mirror assembly includes a gasket contacting an outer perimeter of the mounting opening of the outer door panel.

8. The vehicle door assembly according to claim 7, wherein the dampener is integrally formed with the gasket.

9. The vehicle door assembly according to claim 8, wherein the dampener is a protrusion protruding from a main body of the gasket towards the mounting opening of the outer door panel.

10. The vehicle door assembly according to claim 6, wherein the dampener is provided between the gasket and the mounting opening of the outer door panel.

11. The vehicle door assembly according to claim 10, wherein the dampener abuts the bottom edge of the outer perimeter of the mounting opening.

12. A mirror assembly for a vehicle door, the mirror assembly comprising:

an attachment flange;

a base bracket; and a dampener, the dampener being disposed between the base bracket and at least a portion and the vehicle door such that the base bracket and the vehicle door are spaced with respect to each other by the dampener when the base bracket is supported to the vehicle door, the dampener also being disposed between the attachment flange and the vehicle door such that the attachment flange and the vehicle door are spaced with respect to each other by the dampener when the attachment flange is supported to the vehicle door.

13. The mirror assembly according to claim 12, wherein the dampener is made from a deformable material.

14. The mirror assembly according to claim 13, further comprising a plurality of fasteners configured to attach the base bracket to the vehicle door.

15. The mirror assembly according to claim 14, further comprising a gasket contacting an outer perimeter of an mounting opening of the vehicle door, the fasteners extending adjacent to the gasket to support the mirror assembly to the door when the mirror assembly is supported to the door.

16. The mirror assembly according to claim 15, wherein the dampener is integrally formed with the gasket.

17. The mirror assembly according to claim 16, wherein the dampener is a protrusion protruding from a main body of the gasket towards the vehicle door when the mirror assembly is supported to the door.

18. The mirror assembly according to claim 15, wherein the dampener extends between the gasket and the vehicle door when the mirror assembly is supported to the door.

19. The mirror assembly according to claim 11, wherein the dampener extends towards a mounting opening of the vehicle door when the mirror assembly is supported to the door.

20. The mirror assembly according to claim 19, wherein the dampener abuts a bottom edge of the mounting opening of the vehicle door when the mirror assembly is supported to the door.

* * * * *